(12) United States Patent
Mi et al.

(10) Patent No.: US 8,922,579 B2
(45) Date of Patent: Dec. 30, 2014

(54) DETERMINISTIC VISUAL INDICATION OF USER DATA CONTEXT

(75) Inventors: Zheng Mi, Redmond, WA (US); Nigel Christopher Wolters, Sammamish, WA (US); Hua Wang, Redmond, WA (US); Jennifer Lee Beckmann, Redmond, WA (US); Joseph Dallas Milan, Mercer Island, WA (US); Steven Merlin Twitchell, Renton, WA (US)

(73) Assignee: Microsoft Corporation, Redmond, WA (US)

( * ) Notice: Subject to any disclaimer, the term of this patent is extended or adjusted under 35 U.S.C. 154(b) by 124 days.

(21) Appl. No.: 13/411,677

(22) Filed: Mar. 5, 2012

(65) Prior Publication Data

US 2013/0229429 A1 Sep. 5, 2013

(51) Int. Cl.
*G09G 5/02* (2006.01)

(52) U.S. Cl.
USPC ........... 345/593; 345/589; 345/595; 345/619; 715/212; 715/217; 715/220; 715/821; 715/823; 715/824

(58) Field of Classification Search
CPC ........ G09G 5/06; G06T 11/60; G06F 9/4443; G06F 3/0481; G06F 3/0484; G06F 17/246; G06F 17/211; G06F 8/43
See application file for complete search history.

(56) References Cited

U.S. PATENT DOCUMENTS

| 7,415,481 B2 * | 8/2008 | Becker et al. ........................ 1/1 |
| 7,487,174 B2 | 2/2009 | Chitrapura et al. |
| 8,103,705 B2 | 1/2012 | Chitrapura et al. |
| 2005/0027507 A1 | 2/2005 | Patrudu |
| 2005/0097574 A1 | 5/2005 | Morrison et al. |
| 2006/0253796 A1 | 11/2006 | Wang et al. |
| 2007/0061743 A1 | 3/2007 | Golbandi |
| 2007/0079247 A1 * | 4/2007 | Carignan et al. .............. 715/745 |
| 2007/0136694 A1 | 6/2007 | Friedman et al. |
| 2007/0199051 A1 | 8/2007 | Parikh et al. |
| 2008/0016555 A1 | 1/2008 | Krane |
| 2009/0319956 A1 | 12/2009 | Emard et al. |
| 2010/0275130 A1 * | 10/2010 | McBride ....................... 715/751 |

(Continued)

OTHER PUBLICATIONS

"EXCEL: Working with Multiple Worksheets and Workbooks" Rogers, Donna. Coastal Carolina University, CeTEAL (Center for Teaching Excellence to Advance Learning). Mar. 2006. Accessed from Web: http://www.coastal.edu/ceteal/training/resources/microsoftProducts/Excel-%20MultipleWorksheets.pdf/.*

(Continued)

*Primary Examiner* — Antonio A Caschera
(74) *Attorney, Agent, or Firm* — Nicholas Chen; Kate Drakos; Micky Minhas

(57) ABSTRACT

A VCI (visual context indicator) color is assigned deterministically and proactively at runtime to user data contexts, and is not stored in the database, spreadsheet, or other context. VCI colors can be high contrast friendly colors. The same color is assigned to a given context each time the application runs unless the context's identifying property has changed. Color assignments are not made by users or by the application's designer, but are done instead by hashing from a context's identifying property into a VCI color palette containing, e.g., eight to sixteen colors. Unlike text-selection coloring, VCI coloring is based on the user data context's identifying property. The color assignment visually indicates context by displaying the context's name in the VCI color, or by displaying a graphical element in the VCI color near the context name. VCI color assignment also shows the occurrence and result of changes in user data context.

20 Claims, 2 Drawing Sheets

(56) References Cited

U.S. PATENT DOCUMENTS

| | | | |
|---|---|---|---|
| 2011/0078585 | A1 | 3/2011 | King et al. |
| 2011/0252301 | A1* | 10/2011 | Vollmer et al. ............... 715/229 |
| 2012/0026186 | A1* | 2/2012 | Irace .............................. 345/593 |

OTHER PUBLICATIONS

"How to change the background color of entire row in Excel using VBA code." Ravi Sagar. Feb. 10, 2008. Accessed via web @ http://www.ravisagar.in/node/13 on Feb. 5, 2014.*

"Tracking Chanes—questions." Forum post by "Ruddles." Oct. 29, 2010 accessed via http://www.mrexcel.com/forum/excel-questions/505217-tracking-changes-questions.html on Feb. 5, 2014.*

Hicham Elmongui et al., "Chameleon: Context-Awareness inside DBMSs", Retrieved at <<http://www.cs.purdue.edu/research/technical_reports/2008/TR%2008-028.pdf>>, Oct. 2008, pp. 30.

"CityHash", Retrieved at <<http://en.wikipedia.org/wiki/CityHash>>, May 3, 2011, pp. 2.

"Current Database Context?—Microsoft SQL Server", Retrieved at <<http://bytes.com/topic/sql-server/answers/606598-current-database-context>>, Feb. 22, 2007, pp. 2.

"Data, context and interaction", Retrieved at <<http://en.wikipedia.org/wiki/Data,_context_and_interaction>>, Jan. 14, 2012, pp. 4.

"Hash function", Retrieved at <<http://en.wikipedia.org/wiki/Hash_function#Trivial_hash_function>>, Jan. 21, 2012, pp. 9.

"Java hashCode()", Retrieved at <<http://en.wikipedia.org/wiki/Java_hashCode()>>, Jan. 7, 2012, pp. 3.

"Oracle Database Cross Session Data Cache", Retrieved at <<http://technology.amis.nl/...8/oracle-database-cross-session-data-cache-introducing-the-globally-accessible-database-context>>, Jan. 21, 2009, pp. 4.

"Pearson hashing", Retrieved at <<http://en.wikipedia.org/wiki/Pearson_hashing>>, Dec. 18, 2010, pp. 2.

"User Data Context", Retrieved at <<http://userguide.sisense.com/Help_Index/flddatasources/fldECubes/ctServerManager/ctimportec/user_data_context_security.aspx>>, copyright 2011, pp. 2, Jan. 2011.

"DXLab Launcher: Controlling Applications", Retrieved at <<http://www.dxlabsuite.com/Launcher/Help/ControllingApplications.htm>>, Retrieved Date: Nov. 18, 2011, pp. 4.

Savant, et al., "Chameleon", Retrieved at <<http://www.cs.purdue.edu/Chameleon/>>, Retrieved Date: Nov. 18, 2011, p. 1.

Morimoto, et al., "Context Switching for Fast Key Selection in Text Entry Applications", Retrieved at <<http://www.ime.usp.br/~hitoshi/publications/etra2010a.pdf>>, Symposium on Eye-Tracking Research & Applications, ETRA, 2010, pp. 4, Jan. 2010.

"Essential Graphics, Visual Indicators, and Notifications for Windows Phone", Retrieved at <<http://msdn.microsoft.com/en-us/library/hh202884%028v=vs.92%29.aspx, Sep. 23, 2011, pp. 15.

* cited by examiner

DETERMINISTIC VISUAL INDICATION OF USER DATA CONTEXT

BACKGROUND

Many types of application software are in use. Some examples of applications include enterprise software such as financial systems, customer relationship management, and supply chain management software; infrastructure software such as databases, SQL query editors, email servers, and systems for managing networks and security; information worker software such as time management software, word processors, email and blog clients, spreadsheets, and collaboration tools; content access software such as media players and web browsers; educational software; simulations software; software development tools; media development tools such as graphic arts software, desktop publishing software, multimedia development software, HTML editors, digital animation editors, digital audio and video composition software; product development software such as computer-aided design tools; and many others. Although a distinction may be made between applications and operating systems based on how directly software controls hardware, in some situations operating system code may be used in much the same way as word processor, calculator, image renderer, or other application software. When using applications, users often work in multiple database, product, customer, project, or other contexts. A given user may have tens or even hundreds of different contexts which are viewed, edited, and/or otherwise manipulated during operation of a given application.

SUMMARY

Many applications lack a way to visually indicate a user's current context, to show a context change, and/or to quickly navigate to a desired context based on intuitive visual clues. Most applications rely on a context name or some similar textual property of the context, which can work but is not very intuitive.

However, some embodiments discussed herein use color as a visual context indicator. The color is picked for each context deterministically at runtime; color assignments are not necessarily stored within the context's database, spreadsheet, or other files. The colors may also be chosen in a way that honors high contrast mode by default. The precise nature of user data contexts depends on the application, but in general each user data context includes at least one user data item containing user-generated data content such as a web page, a database, a piece of text, an image, or a spreadsheet.

As a precursor to some embodiments, an application designer selects a palette of colors (a "VCI palette") to be used as visual context indicators. The VCI palette is "predefined" meaning it was defined before creation of the user data contexts that are being colored. The VCI palette may overlap an application graphical user interface palette that is used for coloring embedded graphical elements of an application such as menus, icons, text selection, and so on, but need not do so. Unlike menus and other embedded graphical elements, the user data contexts to be colored from the VCI palette are not known to the application designer when the VCI palette is defined, because the VCI palette is used to color user-generated data contexts such as different databases or different project files. In contrast, the application designer will typically know—before the application ever reaches an end-user—what menus are embedded in the application. Likewise, the application designer will typically know what icons are embedded to indicate operations of the application, e.g., brush size or pattern in a graphics application, and font characteristics in a word processing application. The VCI palette is thus conceptually, and in some embodiments literally, distinct from the palette of colors used for embedded graphical elements such as menus, dialogs, and window borders.

Although the VCI palette is predefined, it is not necessarily free of definitional constraints. In some cases, for example, the color selected by hashing the user data context property will consistently be a color that is available on a display in high contrast mode. As a practical matter, the VCI palette will be a subset of a global palette that is available to the application for embedded graphical elements, text, images, and so on. In many cases, the global palette includes hundreds, thousands, or even millions of possible colors, whereas the VCI palette generally contains many fewer colors. In some embodiments, the color assignment deterministically assigns to the user data contexts as visual context indicators at least eight colors from the palette and not more than sixteen colors from the palette.

In some embodiments a color is selected from a predefined palette of colors, such as from a VCI palette previously defined by an application designer or from another predefined palette. A color assignment is then made by deterministically computationally and proactively assigning the selected color to a user data context of an application program. The application program may be a database, spreadsheet, or any other horizontal or vertical (niche) application program, for example. The user data context is created by activity of a user in the application program. Since the palette is predefined, the user data context was created after the palette of colors was defined, and the palette may well have been defined by someone other than the user who created the user data context. That is, the palette of colors available for indicating visual context is not necessarily chosen by the user, being instead chosen automatically and proactively by the application. The color assignment is provided for use specifically as a visual context indicator in a user interface display of the application program.

The color assignment may be "deterministic" in one or more of various ways, depending on the embodiment. It may be that the same color is assigned to the same user data context each time the application is run, or that the same color is assigned each time unless the user specifically overrides the color assignment. It may be that the color assignment is deterministic in the sense that color assignments are not chosen by users of the application, but are instead determined automatically by hashing from a name or other identifying property of a user data context into the VCI palette. Depending on the embodiment, suitable identifying properties for use in assigning VCI colors may include, e.g., user-selected values such as a path including a file name, a file name, a nickname, or an alias.

In some embodiments, the color assignment is not made to show that the user has selected an individual item, e.g., a word of text, a spreadsheet cell entry, a diagram box, a diagram connection, or the like. In other words, the visual context indicator differs from a selection color which is used to indicate that a user has selected some item that could well occur in multiple instances and/or in multiple data contexts. Unlike text-selection coloring, for instance, different user data contexts are typically (or always, in some embodiments) given different colors, whereas different pieces of text are always shown as selected by using the same text-selection coloring. VCI coloring is determined automatically and proactively based on the user data context's identifying property value, not by the user's act of selecting some piece of data within a user data context.

The color assignment may be used as a visual context indicator in one or more of various ways, depending on the embodiment. In some, a graphical element (i.e., rectangle or other filled shape) is displayed in the color assigned to a particular user data context near a displayed context name which identifies that user data context. Such VCI graphical elements are not embedded, in the sense that their color was not predetermined prior to the creation of user data contexts, unlike embedded graphical elements such as menus. In some embodiments, the color assignment is used as a visual context indicator by displaying a text portion of a context name and/or a text background portion of a context name in the assigned color. Thus, VCI may be shown in a display that is configured at least in part by the application program, even though the VCI color assignment differs in purpose and/or other ways (such as available colors, assignment mechanism) from the coloring of other elements such as menus which also configure the display.

In some embodiments, the application provides a focus. User data is editable by the user when that user data has the focus. In such applications, the color assignment can be used as a visual context indicator to show the occurrence and result of changes in user data context. When the focus changes from one user data context to another user data context, a corresponding change occurs in the colors displayed, thereby indicating that the context has changed and also indicating which context currently has the focus. In some embodiments, the application displays a list or other history of recently presented user data contexts, thereby showing a correspondence between assigned colors and their respective recently used user data contexts. More generally, the display may show at a given time multiple user data contexts that are visually indicated by their respective assigned colors of the VCI palette.

In embodiments that use hashing to make VCI color assignments, it may happen that two different identifying property values both hash to a single selected color. In such cases, that single selected color can be used as a visual context indicator for each of two different user data contexts. Conversely, it may happen that two different VCI colors are assigned to the same user data context at different times, due to an intervening change made by the user to the identifying property's value. Note that changes to other data in the user data context do not impact the choice of VCI color, because that other data is not hashed to make the VCI color assignment.

The examples given are merely illustrative. This Summary is not intended to identify key features or essential features of the claimed subject matter, nor is it intended to be used to limit the scope of the claimed subject matter. Rather, this Summary is provided to introduce—in a simplified form—some concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Figure 1:
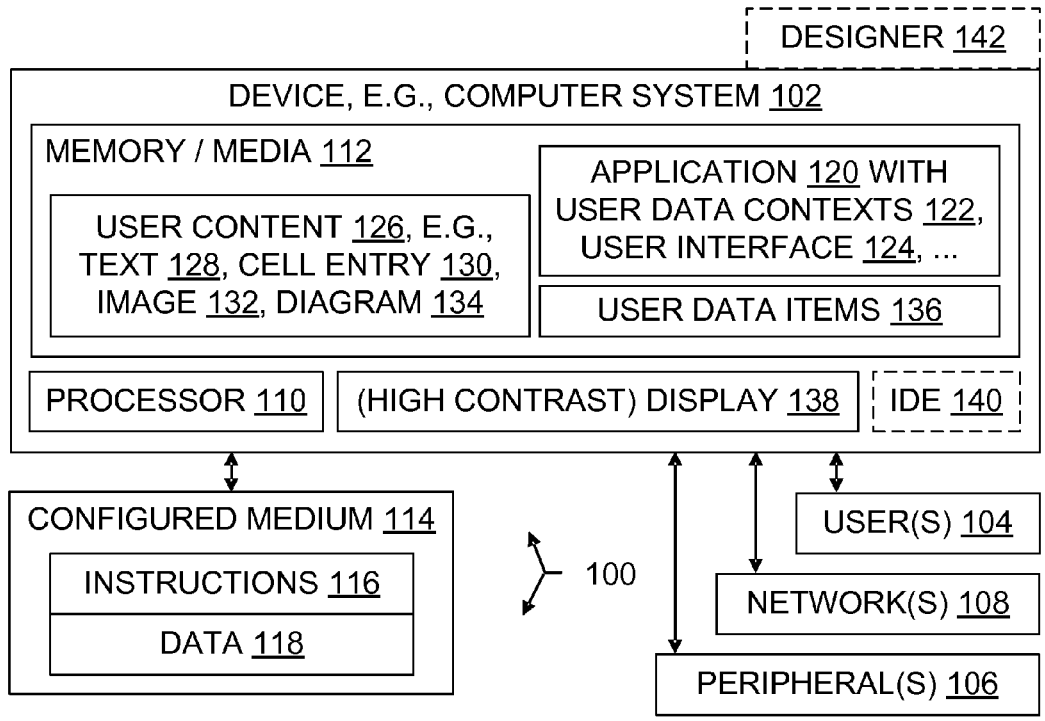
FIG. 1 is a block diagram illustrating a computer system having at least one processor, at least one memory, at least one application, and other items in an operating environment which may be present on multiple network nodes, and also illustrating configured storage medium embodiments.

After being suitably equipped according to teachings herein, database and other applications can provide users with one or more benefits of visual context indication, such as an intuitive way to recognize context changes and to navigate among contexts. Context colors (also referred to as VCI colors) are assigned to respective data contexts, and displayed to indicate which context(s) are accessible. Moreover, visual context indication can be provided without any format change or content change to legacy databases or other user-generated content to inject new color attributes or the like, because context colors can be assigned to legacy content based on a name or other identifying property that is already present in that content. Database applications are used herein to illustrate aspects of visual context indication, but they are merely one of the many kinds of applications that provide users with access to multiple user data contexts.

Some approaches described herein use a predetermined set of colors that by default honors the high contrast mode available in many displays. The number of colors can vary, but to help users easily remember a color and associate it with a given database or other context, the number of colors is relatively small in many embodiments. At the same time, if the number of context colors is too small a user may face too many contexts with the same color. As a starting point, eight to sixteen colors provides a good range for the number of context colors, but a given embodiment may have a number of context colors which is outside that range (less than eight, or more than sixteen).

In some embodiments, each database or other user data context has a name property, and a hash function maps each name to a context color in the VCI palette. Those of skill will appreciate that a suitable hash function can be created in many different ways. One may select a hash function that tends to minimize the collisions based on the nature of the property.

Using a hash function helps make the color of the database or other context predictable to users from one user session to the next because the assigned color does not change as long as the name property doesn't change. Such embodiments also provide the benefit of not requiring permanent storage, on client or server or elsewhere, to store the color mapping. Note that although the name is used as an example of the property to hash, there are other suitable choices of a property (or set of properties) to hash, since other properties may also serve to identify a given context by distinguishing it from other contexts that are used by the user.

Some embodiments described herein may be viewed in a broader context. For instance, concepts such as context, coloring, selection, hashing, focus, history, names, and/or high contrast colors may be relevant to a particular embodiment. However, it does not follow from the availability of a broad context that exclusive rights are being sought herein for abstract ideas; they are not. Rather, the present disclosure is focused on providing appropriately specific embodiments. Other media, systems, and methods involving context, coloring, selection, hashing, focus, history, names, and/or high contrast colors are outside the present scope. Accordingly, vagueness and accompanying proof problems are also avoided under a proper understanding of the present disclosure.

Reference will now be made to exemplary embodiments such as those illustrated in the drawings, and specific language will be used herein to describe the same. But alterations and further modifications of the features illustrated herein, and additional applications of the principles illustrated herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage, in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise their right to their own lexicography. Terms may be defined, either explicitly or implicitly, here in the Detailed Description and/or elsewhere in the application file.

As used herein, a "computer system" may include, for example, one or more servers, motherboards, processing nodes, personal computers (portable or not), personal digital assistants, cell or mobile phones, other mobile devices having at least a processor and a memory, and/or other device(s) providing one or more processors controlled at least in part by instructions. The instructions may be in the form of firmware or other software in memory and/or specialized circuitry. In particular, although it may occur that many embodiments run on workstation or laptop computers, other embodiments may run on other computing devices, and any one or more such devices may be part of a given embodiment.

A "multithreaded" computer system is a computer system which supports multiple execution threads. The term "thread" should be understood to include any code capable of or subject to scheduling (and possibly to synchronization), and may also be known by another name, such as "task," "process," or "coroutine," for example. The threads may run in parallel, in sequence, or in a combination of parallel execution (e.g., multiprocessing) and sequential execution (e.g., time-sliced). Multithreaded environments have been designed in various configurations. Execution threads may run in parallel, or threads may be organized for parallel execution but actually take turns executing in sequence. Multithreading may be implemented, for example, by running different threads on different cores in a multiprocessing environment, by time-slicing different threads on a single processor core, or by some combination of time-sliced and multi-processor threading. Thread context switches may be initiated, for example, by a kernel's thread scheduler, by user-space signals, or by a combination of user-space and kernel operations. Threads may take turns operating on shared data, or each thread may operate on its own data, for example.

A "logical processor" or "processor" is a single independent hardware thread-processing unit, such as a core in a simultaneous multithreading implementation. As another example, a hyperthreaded quad core chip running two threads per core has eight logical processors. Processors may be general purpose, or they may be tailored for specific uses such as graphics processing, signal processing, floating-point arithmetic processing, encryption, I/O processing, and so on.

A "multiprocessor" computer system is a computer system which has multiple logical processors. Multiprocessor environments occur in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

"Kernels" include operating systems, hypervisors, virtual machines, BIOS code, and similar hardware interface software.

"Code" means processor instructions, data (which includes constants, variables, and data structures), or both instructions and data.

"Program" is used broadly herein, to include applications, kernels, drivers, interrupt handlers, libraries, and other code written by programmers (who are also referred to as developers).

"Automatically" means by use of automation (e.g., general purpose computing hardware configured by software for specific operations discussed herein), as opposed to without automation. In particular, steps performed "automatically" are not performed by hand on paper or in a person's mind; they are performed with a machine.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise beyond the scope of human performance alone. "Computational steps" are steps performed computationally. Neither "automatically" nor "computationally" necessarily means "immediately".

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

Throughout this document, use of the optional plural "(s)", "(es)", or "(ies)" means that one or more of the indicated feature is present. For example, "processor(s)" means "one or more processors" or equivalently "at least one processor".

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as assigning, changing, choosing, configuring, containing, creating, defining, displaying, editing, executing, generating, hashing, identifying, including, indicating, making, manipulating, operating, providing, residing, running, selecting, showing, using (and/or assigns, assigned, changes, changed, etc.) with regard to a destination or other subject may involve intervening action such as forwarding, copying, uploading, downloading, encoding, decoding, compressing, decompressing, encrypting, decrypting, authenticating, invoking, and so on by some other party, yet still be understood as being performed directly by the party of interest.

Whenever reference is made to data or instructions, it is understood that these items configure a computer-readable memory and/or computer-readable storage medium, thereby transforming it to a particular article, as opposed to simply existing on paper, or in a person's mind, for example. No claim covers a signal per se.

Operating Environments

With reference to FIG. 1, an operating environment 100 for an embodiment may include a computer system 102. The computer system 102 may be a multiprocessor computer system, or not. An operating environment may include one or more machines in a given computer system, which may be clustered, client-server networked, and/or peer-to-peer networked. An individual machine is a computer system, and a group of cooperating machines is also a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106, via typed text, touch, voice, movement, computer vision, gestures, and/or other forms of I/O. System administrators, developers, engineers, and end-users are each a particular type of user 104. Automated agents, scripts, playback software, and the like acting on behalf of one or more people may also be users 104. Storage devices and/or networking devices may be considered peripheral equipment in some embodiments. Other computer systems not shown in FIG. 1 may interact with the computer system 102 or with another system embodiment using one or more connections to a network 108 via network interface equipment, for example.

The computer system 102 includes at least one logical processor 110. The computer system 102, like other suitable systems, also includes one or more computer-readable storage media 112. Media 112 may be of different physical types. The media 112 may be volatile memory, non-volatile memory, fixed in place media, removable media, magnetic media, and/or optical media, as opposed to media such as a wire that merely propagates a signal. In particular, a configured medium 114 such as a CD, DVD, memory stick, or other removable non-volatile memory medium may become functionally part of the computer system when inserted or otherwise installed, making its content accessible for use by processor 110. The removable configured medium 114 is an example of a computer-readable storage medium 112. Some other examples of computer-readable storage media 112 include built-in RAM, ROM, hard disks, and other memory storage devices which are not readily removable by users 104. Neither a computer-readable medium nor a computer-readable memory includes a signal per se.

The medium 114 is configured with instructions 116 that are executable by a processor 110; "executable" is used in a broad sense herein to include machine code, interpretable code, and code that runs on a virtual machine, for example. The medium 114 is also configured with data 118 which is created, modified, referenced, and/or otherwise used by execution of the instructions 116. The instructions 116 and the data 118 configure the medium 114 in which they reside; when that memory is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by hashing, coloring, backup, restore, commits, aborts, reformatting, and/or other operations.

One or more applications 120 with shared or respective user data contexts 122 and user interfaces 124, user-generated content 126 (e.g., text 128, spreadsheet cell entries 130, still or moving images 132, flowcharts or other diagrams 134), other user data items 136 (e.g., objects, files, project folders, etc.), and other items shown in the Figures and/or discussed in the text, may each reside partially or entirely within one or more media 112, thereby configuring those media. In addition to display(s) 138 (high contrast and/or otherwise), an operating environment may also include other hardware such as buses, power supplies, and accelerators, for instance.

A given operating environment 100 may include an Integrated Development Environment (IDE) 140 which provides a developer with a set of coordinated software development tools. In particular, some of the suitable operating environments for some embodiments include or help create a Microsoft® Visual Studio® development environment (marks of Microsoft Corporation) configured to support program development. Some suitable operating environments include Java® environments (mark of Oracle America, Inc.), and some include environments which utilize languages such as C++ or C# ("C-Sharp"), but teachings herein are applicable with a wide variety of programming languages, programming models, and programs, as well as with endeavors outside the field of software development per se.

During an application 120 design phase, an application designer 142 may be considered a user 104. After an application has been designed and released to others (in alpha, beta, or commercially), the designer 142 often transitions out of being a user 104. But the work product of a designer 142 or other person who created some aspect of an application 120 may be part of the environment 100, even though the designer 142 is no longer an active presence (or present at all) in the environment at the time the application is in normal use by end users 104 operating on their data contexts 122.

One or more items are shown in outline form in FIG. 1 to emphasize that they are not necessarily part of the illustrated operating environment, but may interoperate with items in the operating environment as discussed herein. It does not follow that items not in outline form are necessarily required, in any Figure or any embodiment.

Systems

Figure 2:
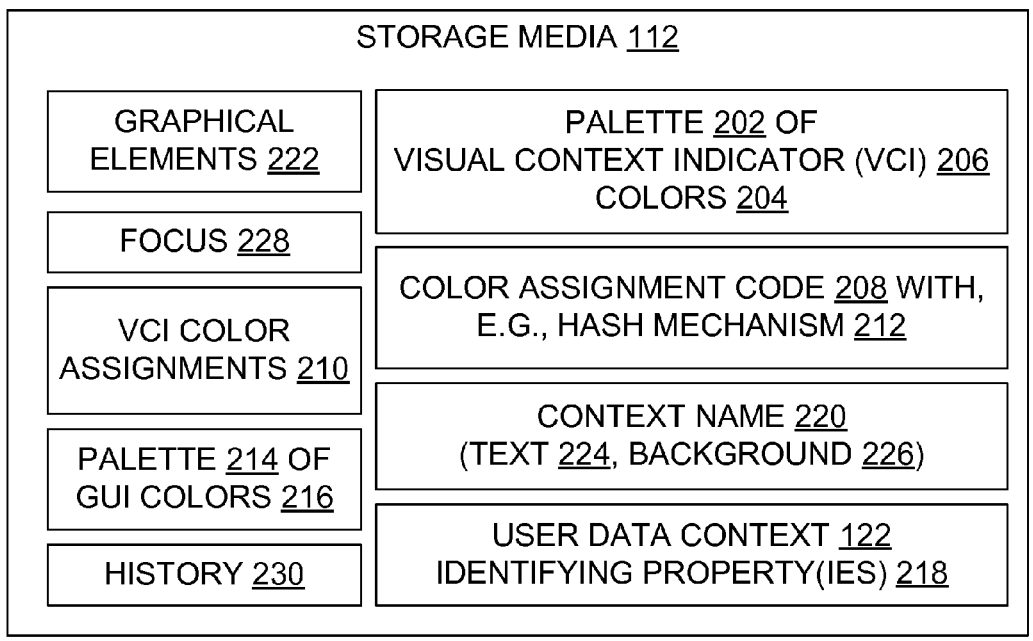
FIG. 2 is a block diagram illustrating an example architecture having visual context indication aspects.

FIG. 2 illustrates aspects of an architecture which is suitable for use with some embodiments. A visual context indicator system 102 includes an application 120, a set of user data contexts 122 manipulated using the application 120, and a palette 202 of colors 204 for use in visual context indicators 206. Each user data context 122 includes one or more user data items 136, which can be manipulated (viewed and edited) using the application. User data items 136 include user-generated data content 126, such as web pages, databases, text, images, spreadsheets, etc. The palette 202 of colors 204 includes a previously selected set of colors. For example, the palette 202 of colors 204 could be previously selected by the application's designer 142.

In operation, some embodiments of the visual context indicator system 102 assign one color 204 to each user data context 122 in a deterministic way. For example, in some the same color 204 is assigned to the same user data context 122 each time the application 120 is run unless the user 104 specifically overrides the color assignment 210 (assuming user override is allowed—in some embodiments it is not allowed). Color assignments 210 are not persisted in the user's data items 136; an assignment 210 is recomputed by code 208 each time the user data context is loaded into the application 120 for use.

In some embodiments, the color assignments differ from other uses of color. For example, the user data contexts 122 are substantially user-generated, so the designer 142 who selected the VCI colors 204 did not have access to the specific data contexts when choosing the colors 204—this differs from assigning colors 216 to GUI menu items embedded in the user interface 124, for instance. The VCI palette 202 will often contain many fewer colors than a global palette 214. In some embodiments, there are from eight to sixteen colors 204 (with exactly sixteen colors 204 in one embodiment) in the VCI palette 202, but there are thousands or even millions of colors 216 in the global palette 241. Color assignments 210 are not highlights made to show user selection of an item—they differ in purpose from text selection coloring. Specific color assignments 210 themselves are also not made by the application's designer 142—they differ in origin from color-coded menu item groupings. Color assignments 210 are also not directly generated or chosen by users 104—they are made automatically, using a previously defined palette 202 and a selection mechanism (e.g. a hashing mechanism 212) that are not readily controlled by the user 104.

In some embodiments, the assignment of colors 204 is done by a hash mechanism 212 hashing from an identifying property 218 of the user data context 122 into the VCI palette 202. Identifying properties 218 are properties that are typically chosen by the user 104, and that can differentiate one user data context 122 from another user data context 122 without comparing a significant amount (more than one percent) of the two context's data content 126. Some examples of identifying properties 218 include a user data context name 220 (full path and file name, file name alone, nickname, or alias) and user data context serial number (which can be automatically generated but is effectively chosen by the user's acceptance). Two or more such properties can also be combined to form an identifying property 218 to be hashed by the color assignment code 208. Likewise, an identifying property 218 can be combined with a timestamp, owner ID, or other value that is not identifying on its own, to be hashed by the color assignment code 208.

In some embodiments, the palette colors 204 are all available on a display 138 that is in high contrast mode. A high contrast display 138 may have other modes that are not high contrast, or it may be capable only of high contrast operation. A display 138 is not necessarily a high contrast display; display color capabilities vary according to the embodiment.

In some embodiments, a graphical element 222 in the color 204 assigned to a user data context 122 is displayed near a context name 220 that identifies that user data context, and/or the context name 220 is displayed in the assigned color. The displayed context name 220 includes a text 224 and background 226 behind that text 224. In some embodiments, the text 224 is displayed in the assigned color 204, and in some the context name's background 226 is displayed in the assigned color 204.

In some embodiments, the application 120 provides a focus 228, and user data is editable only when it has the focus. When the focus changes from one context 122 to another context 122 the user sees a corresponding change in the colors 204 displayed, indicating that the context has changed and also indicating which context currently has the focus.

In some embodiments, the application 120 includes a displayed list or other history 230 of recently used contexts 122, showing the correspondence between assigned colors 204 and their respective recently used contexts 122. When there are more contexts 122 than there are colors 204 in the palette 202, a color 204 can be hashed or otherwise mapped to multiple contexts 122.

In some embodiments, assume the database or other context 122 is hashed to select a color 204, that color is then assigned to the context 122, and later the user changes the context name 220. The new name 220, 218 will then get hashed by code 208, often resulting in a color assignment 210 change.

With reference to FIGS. 1 and 2, some embodiments provide a computer system 102 with a logical processor 110 and a memory medium 112 configured by circuitry, firmware, and/or software to transform a display by extending functionality with visual context indications as described herein.

In some embodiments peripherals 106 such as human user I/O devices (screen, keyboard, mouse, tablet, microphone, speaker, motion sensor, etc.) will be present in operable communication with one or more processors 110 and memory. However, an embodiment may also be deeply embedded in a system, such that no human user 104 interacts directly with the embodiment. Software processes may be users 104.

In some embodiments, the system includes multiple computers connected by a network. Networking interface equipment can provide access to networks 108, using components such as a packet-switched network interface card, a wireless transceiver, or a telephone network interface, for example, will be present in a computer system. However, an embodiment may also communicate through direct memory access, removable nonvolatile media, or other information storage-retrieval and/or transmission approaches, or an embodiment in a computer system may operate without communicating with other computer systems.

Some embodiments operate in a "cloud" computing environment and/or a "cloud" storage environment in which computing services are not owned but are provided on demand. For example, color assignment code 208 may be on multiple devices/systems 102 in a networked cloud, databases and/or other user data contexts 122 may be stored on yet other devices within the cloud, and the application 120 with visual context indicators 206 may configure the display on yet other cloud device(s)/system(s) 102.

Processes

Figure 3:
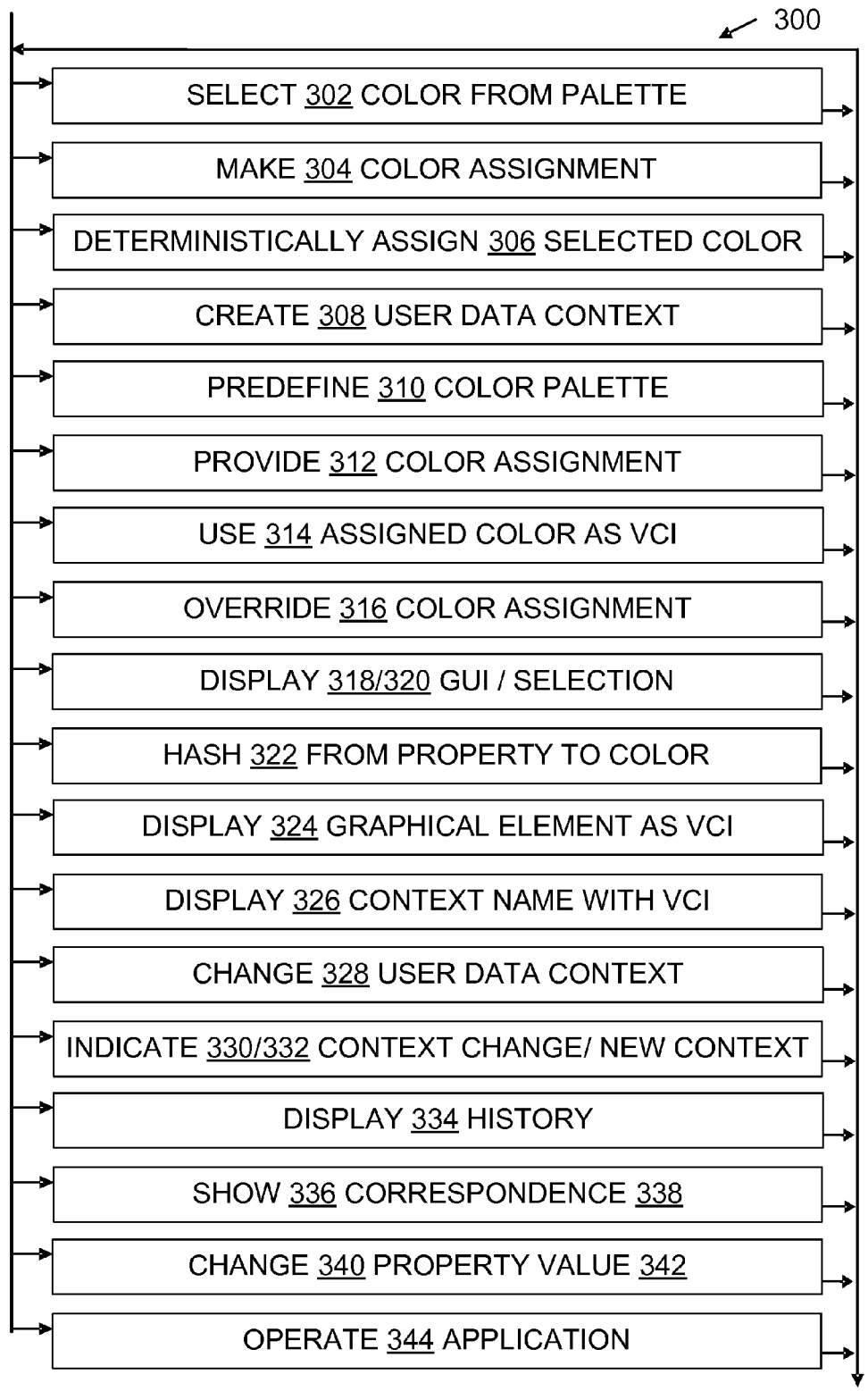
FIG. 3 is a flow chart illustrating steps of some process and configured storage medium embodiments.

FIG. 3 illustrates some process embodiments in a flowchart 300. Processes shown in the Figures may be performed in some embodiments automatically, e.g., by color assignment code 208 driven by requests from an application 120 under control of a script or playback mechanism, or otherwise requiring little or no contemporaneous live user input. Processes may also be performed in part automatically and in part manually unless otherwise indicated. In a given embodiment zero or more illustrated steps of a process may be repeated, perhaps with different parameters or data to operate on. Steps in an embodiment may also be done in a different order than the top-to-bottom order that is laid out in FIG. 3. Steps may be performed serially, in a partially overlapping manner, or fully in parallel. The order in which flowchart 300 is traversed to indicate the steps performed during a process may vary from one performance of the process to another performance of the process. The flowchart traversal order may also vary from one process embodiment to another process embodiment. Steps may also be omitted, combined, renamed, regrouped, or otherwise depart from the illustrated flow, provided that the process performed is operable and conforms to at least one claim.

Examples are provided herein to help illustrate aspects of the technology, but the examples given within this document do not describe all possible embodiments. Embodiments are not limited to the specific implementations, arrangements, displays, features, approaches, or scenarios provided herein. A given embodiment may include additional or different features, mechanisms, and/or data structures, for instance, and may otherwise depart from the examples provided herein.

As a precursor to some embodiments, an application designer or other person selects 302 a palette of colors (a VCI palette 202) to be used as visual context indicators. The VCI palette is predefined 310, before creation 308 of the user data contexts that are being colored. The VCI palette 202 overlaps an application graphical user interface 124 palette in some embodiments. As a practical matter, the VCI palette 202 will be a subset of a global palette 214. In some embodiments, the color assignment deterministically assigns 306 to the user data contexts 122 as visual context indicators 206 at least eight colors 204 from the palette 202 and not more than sixteen colors 204 from the palette 202.

In some embodiments a color assignment 210 is made 304 by deterministically computationally and proactively assigning 306 the selected color to a user data context of an application program 120. The color assignment is provided 312 for use 314 specifically as a visual context indicator 206 in a user interface display 318 of an application program 120 during operation 344 of a suitably equipped (e.g., with code 208 access) application.

The color assignment may be made deterministically in one or more of various ways, depending on the embodiment. It may be that the same color is assigned 306 to the same user data context each time the application is run, or that the same color is assigned 306 each time unless the user specifically overrides 316 the color assignment. The color assignment may be made deterministic in that color assignments are not chosen by users of the application during operation 344 of the application, but are instead determined automatically during operation 344 by hashing 322 from a name or other identifying property 218 of a user data context into the VCI palette.

In some embodiments, the color assignment is not made to show that the user has selected an individual item such as a piece of text in a document or a row in a spreadsheet. The visual context indicator differs from a selection 320 color. Unlike text-selection coloring, for instance, different user data contexts are typically (or always, in some embodiments) given different colors, whereas different pieces of text are always shown 320 as selected by using the same text-selection coloring. VCI coloring is determined automatically and proactively during operation 344 of an application 120, based on the user data context's identifying property value, not by the user's act of selecting some piece of data within a user data context.

The color assignment may be used 314 as a visual context indicator 206 in one or more of various ways, depending on the embodiment. In some, a graphical element 222 (i.e., rectangle or other filled shape) is displayed 324 in the color 204 assigned to a particular user data context, near a displayed 326 context name 220 which identifies that user data context. Such VCI graphical elements are not embedded, in the sense that their color 204 was not assigned prior to the creation 308 of user data contexts, unlike embedded graphical elements such as menus. In some embodiments, the color assignment is used 314 as a visual context indicator by displaying 326 a text 224 portion of a context name and/or displaying 326 a text background 226 portion of a context name in the assigned 306 color 204. Thus, VCI 206 may be shown in a display 138 that is configured at least in part by the application program, even though the VCI color assignment 210 differs in purpose and/or other ways (such as the available colors 204 and the assignment mechanism 208, 212) from the coloring of other elements such as GUI 124 menus which also configure the display 138.

In some embodiments, the application 120 provides a focus 228. In such applications, the color assignment can be used 314 as a visual context indicator to visually indicate 330 a change 328 in the user data context 122 and to visually indicate 332 the resulting new (newly given the focus) user data context. When the focus changes 328 from one user data context to another user data context, a corresponding change occurs in the colors 204 displayed 314, 318, 324, 326, thereby indicating 330 that the context has changed and also indicating 332 which context currently has the focus. In some embodiments, the application displays 334 a list or other history 230 of recently presented user data contexts with their colors 204, thereby showing 336 a correspondence 338 between assigned 306 colors 204 and their respective recently used user data contexts 122. More generally, the display 138 may show 336 at a given time multiple user data contexts 122 that are each visually indicated 314 by their respective assigned colors 204 of the VCI palette 202.

In embodiments that use hashing 322 to make VCI color assignments, it may happen that two different identifying property values both hash to a single selected color. In such cases, that single selected color can be used 314 as a visual context indicator for each of two different user data contexts. Conversely, it may happen that two different VCI colors are assigned 306 to the same user data context at different times, due to an intervening change 340 made by the user to the identifying property's value 342. Note that changes to other data in the user data context do not impact the choice of VCI color, because that other data is not hashed 322 to make the VCI color assignment.

Configured Media

Some embodiments include a configured computer-readable storage medium 112. Medium 112 may include disks (magnetic, optical, or otherwise), RAM, EEPROMS or other ROMs, and/or other configurable memory, as opposed to wires and other propagated signal media. The storage medium which is configured may be in particular a removable storage medium 114 such as a CD, DVD, or flash memory. A general-purpose memory, which may be removable or not, and may be volatile or not, can be configured into an embodiment using items such as color assignment code 208, hashing mechanism(s) 212, and visual context indicators 206, in the form of data 118 and instructions 116, read from a removable medium 114 and/or another source such as a network connection, to form a configured medium. The configured medium 112 is capable of causing a computer system to perform process steps for transforming data through visual context indications as disclosed herein. FIGS. 1 through 3 thus help illustrate configured storage media embodiments and process embodiments, as well as system and process embodiments. In particular, any of the process steps illustrated in FIG. 3, or otherwise taught herein, may be used to help configure a storage medium to form a configured medium embodiment.

Additional Examples

Additional details and design considerations are provided below. As with the other examples herein, the features described may be used individually and/or in combination, or not at all, in a given embodiment.

Those of skill will understand that implementation details may pertain to specific code, such as specific APIs and specific sample programs, and thus need not appear in every embodiment. Those of skill will also understand that program identifiers and some other terminology used in discussing details are implementation-specific and thus need not pertain to every embodiment. Nonetheless, although they are not necessarily required to be present here, these details are provided because they may help some readers by providing context and/or may illustrate a few of the many possible implementations of the technology discussed herein.

Those of skill will understand that hashing 322 from an identifying property 218 value 342 to a color 204 in the VCI palette 202 can be implemented in various ways. Hash functions in general and apart from their specific usage taught herein, are familiar and well understood, and such understanding can be applied to select a useful hash mechanism 212 in view of the present disclosure. In particular embodiments, color assignment code 208 may perform hashing 322 by any suitable procedure, including for example any of the following: add the values of the characters in a text property 218 by treating them as numeric values rather than characters and then use the result modulo the number of colors 204 in the VCI palette 202 as an index into the VCI palette 202; use a Pearson hash modulo the number of VCI colors as a VCI palette index; use a java.lang.String class or similar implementation of hashCode( ) or a similar hash function modulo the number of VCI colors as a VCI palette index; use a CityHash hash function modulo the number of VCI colors as a VCI palette index; use a combination of hash algorithms.

To further illustrate visual context indication possibilities, several display configurations will now be described textually. Textual description is provided in place of drawing figures for these examples to avoid injecting unnecessary limitations, and also because patent drawing figures are typically monochromatic whereas the visual context indication displays are multi-colored. These particular examples are from an application such as a suitably configured version of a Microsoft® SQL Azure™ application, but it will be understood that the possibilities for visual context indication are not limited to that application, or even limited to database applications (marks of Microsoft Corporation).

A first example of visual context indication displays databases with an assigned 306 color mapping. Each database is shown by a rectangular area on screen, with each rectangular area containing a database name 220, other database property information such as edition and maximum size, and a filled colored bar graphical element 222 showing 336 the color 204 assigned 306 to that database 122. Six different colors 204 are thus shown 336. Some of the colors 204 are used 314 for more than one database in this example.

A second example of visual context indication displays a color 204 indication 332 of the current context. The user interface for a single database 122 dominates the display 138. The name 220 of the database is shown in a light color against a darker background 226 which is in the assigned VCI color 204. Menu options and other GUI elements are shown in the color(s) 216 that were designated for them by a database application designer 142 before the database in question was ever created 308.

A third example visually indicates 330 a context switch, by showing both the old database context in its assigned 306 color and the new database context in its assigned 306 color. In some embodiments, the old context's color is grayed out and/or the new context's color is heightened, e.g., by altering color 204 saturation or intensity.

A fourth example displays 334 a history 230, use assigned VCI colors 204 to indicate the recently used contexts. The name 220 of each recently used database context is shown under a heading "Recent", with each name next to a vertical rectangular bar filled in that context's assigned 306 VCI color. The three most recent contexts are displayed 334 in this example, but the cutoff may vary. In this example, the names of other available database contexts 122 are also shown under a heading "All Databases". Navigation buttons are also shown, e.g., for Login, Logoff, and Help.

CONCLUSION

Although particular embodiments are expressly illustrated and described herein as processes, as configured media, or as systems, it will be appreciated that discussion of one type of embodiment also generally extends to other embodiment types. For instance, the descriptions of processes in connection with FIG. 3 also help describe configured media, and help describe the operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific features of an example may be omitted, renamed, grouped differently, repeated, instantiated in hardware and/or software differently, or be a mix of features appearing in two or more of the examples. Functionality shown at one location may also be provided at a different location in some embodiments.

Reference has been made to the figures throughout by reference numerals. Any apparent inconsistencies in the phrasing associated with a given reference numeral, in the figures or in the text, should be understood as simply broadening the scope of what is referenced by that numeral.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims and the abstract, as filed, are part of the specification.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific features or acts described above the claims. It is not necessary for every means or aspect identified in a given definition or example to be present or to be utilized in every embodiment. Rather, the specific features and acts described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A computer system comprising:
   a display;
   a logical processor;
   a memory in operable communication with the logical processor;
   at least two data contexts residing in the memory, each data context containing data items and each data context having a different automatically and proactively assigned visual context indicator ("VCI") color which depends on the data context; and
   an application residing in the memory and having at least one user selection color which indicates user selection of a data item, each user selection color being independent of data contexts in that the application displays a given user selection color to indicate user selection of data items in multiple different data contexts, each user selection color being a different color than any of the VCI colors.

2. The system of claim 1, wherein the application also has application user interface colors which appear in at least one menu of a user interface of the application or appear in at least one icon of the user interface of the application, or appear in both, and wherein the VCI colors are different colors than the application user interface colors.

3. The system of claim 1, wherein the application provides a focus such that user data of a data context is editable by the user when that user data's context has the focus, and when the focus changes from one user data context to another user data context a corresponding change occurs automatically in displayed VCI colors to indicate that the data context has changed and to also indicate which data context currently has the focus.

4. The system of claim 1, wherein the display is configured by a history of recently presented user data contexts which shows a correspondence between assigned VCI colors and their respective recently used user data contexts.

5. The system of claim 1, wherein the data contexts each have an identifying property, the value of the identifying property is different for each data context, and which VCI color is assigned to each data context depends at least in part on the value of the identifying property for that data context.

6. The system of claim 5, wherein which VCI color is assigned to a data context depends at least in part on a hash of the value of the identifying property for that data context.

7. The system of claim 1, wherein the display is a high contrast display.

8. A computer-readable storage device configured with data and with instructions that when executed by at least one processor causes the processor(s) to perform a process for visually indicating a user's current data context, the process comprising:
   computationally and proactively selecting from a predefined palette of visual context indicator ("VCI") colors a VCI color for a particular data context and a particular application, the VCI colors being different colors than any color that is used in the application in multiple data contexts as a user selection color, the selected VCI color being a different color than any VCI color previously assigned to a data context for the particular application; and
   computationally and proactively assigning the selected VCI color to the particular data context for the particular application.

9. The computer-readable storage device of claim 8, wherein the application uses a user selection color in multiple data contexts to indicate user selection of a data item, and the VCI color palette does not contain the user selection color.

10. The computer-readable storage device of claim 8, wherein at least one of the following is satisfied:
    the application uses a menu color in at least one menu in multiple data contexts, and the VCI color palette does not contain the menu color;
    the application uses a dialog color in multiple data contexts, and the VCI color palette does not contain the dialog color; or
    the application uses a window border color in in multiple data contexts, and the VCI color palette does not contain the window border color.

11. The computer-readable storage device of claim 8, wherein the VCI color is selected based on a value of an identifying property of the particular data context.

12. The computer-readable storage device of claim 8, wherein the VCI color is selected at application runtime after creation of the particular data context.

13. The computer-readable storage device of claim 8, wherein the VCI color selection is proactive in that it was not done by a user of the application.

14. The computer-readable storage device of claim 8, wherein the VCI color selection is computational in that it was based on hashing from a value of an identifying property of the data context into the VCI color palette.

15. A computational process for visually indicating a user's current data context on a display in a computing environment, the process comprising:
    an application program computationally and proactively selecting a visual context indicator ("VCI") color for a particular data context from a predefined palette of VCI colors in a memory, the VCI colors being different colors than any color that is used in the application in multiple data contexts as a user selection color, the selected VCI color also being a different color than any VCI color previously assigned to a data context by the application, the VCI color being selected at least in part based on an identifying property of the particular data context; and
    computationally and proactively assigning the selected VCI color to the particular data context.

16. The computational process of claim 15, wherein the identifying property includes at least one of the following: a path including a file name, a file name, a nickname, or an alias.

17. The computational process of claim 15, wherein the VCI color assignment is deterministic in that the same VCI color is re-assigned to the particular data context each of multiple times the application runs.

18. The computational process of claim 15, wherein the VCI color is different than any color that is used in the application in multiple data contexts to show that the user has selected any one or more of the following data items: a word of text, a spreadsheet cell entry, a diagram box, or a diagram connection.

19. The computational process of claim 15, wherein a graphical element is displayed in the VCI color near a displayed context name which identifies the particular data context.

20. The computational process of claim 15, wherein the VCI palette includes at least eight colors and the application assigns as VCI colors not more than sixteen of the VCI palette colors.

* * * * *